Dec. 29, 1931.  R. T. WALES  1,838,203
WALL
Filed July 27, 1929
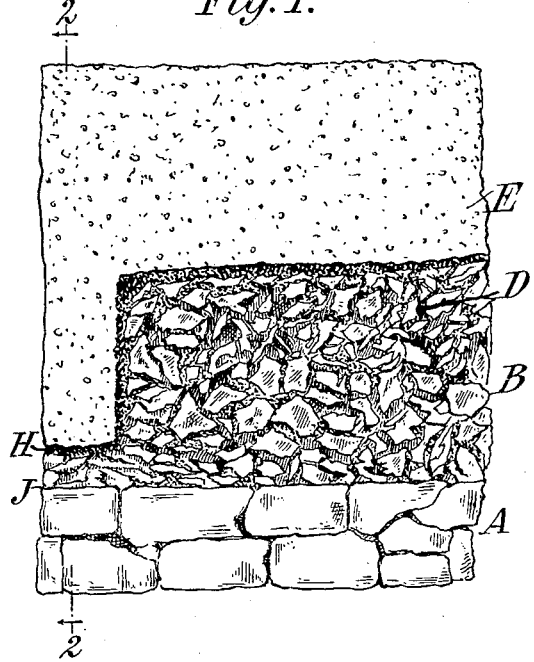
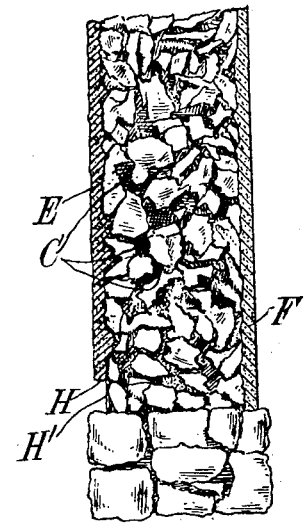
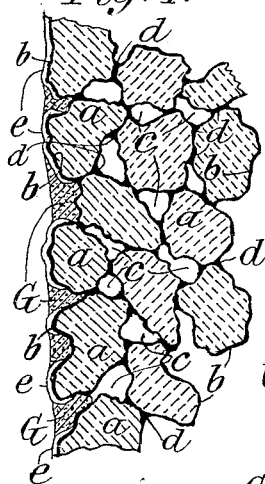
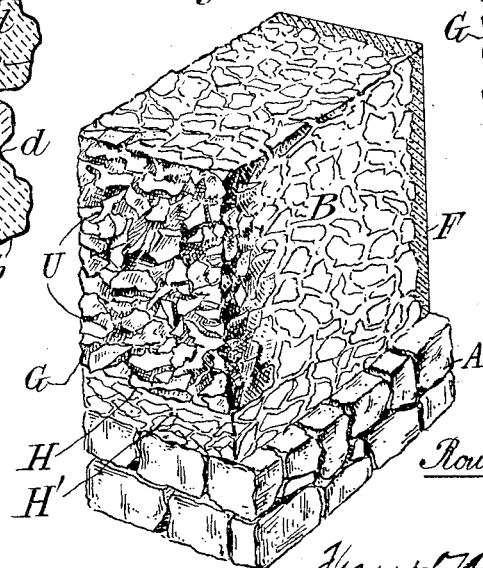
INVENTOR
Rowland T. Wales,
By Attorneys, Patented Dec. 29, 1931

1,838,203

UNITED STATES PATENT OFFICE

ROWLAND T. WALES, OF NEW ROCHELLE, NEW YORK

WALL

Application filed July 27, 1929. Serial No. 381,506.

This application is in part a continuation of my application Serial No. 51,184, filed August 19, 1925.

One of the objects of the present invention is to provide a wall for buildings or other purposes which has certain advantages over those now in use. In its preferred form I utilize a concrete structure which has a substantial percentage of voids throughout its mass, but which, nevertheless, possesses sufficient strength for constituting walls of substantial thickness. Such a wall as is preferred has the capacity of being a poor conductor and a good insulator of heat. Such a wall after being erected is provided, according to the present invention, with a surface coating of plaster, mortar, stucco, or the like, which can be done without the use of lath or furring of any kind. According to a preferred form of the invention the coated wall is so constructed as to provide an ornate and unique appearance not hitherto attained. Other subjects of the invention will be hereinafter referred to.

Referring to the drawings which illustrate various features of the invention:

Figure 1 is a side elevation of a wall with parts thereof broken away.

Fig. 2 is a transverse section of Fig. 1 taken substantially on the plane of the line 2—2.

Fig. 3 is a perspective view of a section of a wall showing the preferred construction of my invention.

Fig. 4 is a fragmentary section of a portion of the concrete structure in its preferred form.

Fig. 5 is a fragmentary, vertical section of a part of a wall or block.

In modern concrete building practice the object is to reduce to a minimum or entirely eliminate voids, so that the resulting product will be as dense as possible. In such practice the concrete is composed of three basic ingredients, namely, (1) coarse aggregate such as broken rock, stone, slag, cinder, and the like; (2) fine aggregate, such as sand, and (3) Portland cement. The Portland cement, which is the active ingredient, serves to bind all the particles of the aggregate together and fill the voids between the particles of the fine aggregate in the mixture. The strength of the concrete is proportional to its density, other conditions being equal, including a sufficient amount of Portland cement present to make a good bond between all the particles of the aggregate. Whenever the magnitude of the work makes grading the aggregate lead to economy, or if very strong concrete is desired, the aggregate is made up of particles which vary in size over a considerable range and according to a gradation which gives the maximum density. Such aggregate also requires the minimum amount of Portland cement.

According to my invention in its preferred form, however, in contrast to modern practice, I use a concrete which possesses the least possible density commensurate with its required strength. Thus a concrete is used which has at least twenty-five per cent. voids and preferably more, even up to 40% when possible. No sand or fine aggregate is purposely employed, but if present accidentally it must be in such small proportion as to be practically negligible and not sufficient to reduce the desired proportion of voids. In constructing a wall or similar structure I use an early-hardening cement, which acquires substantial strength within an extremely short time, and which has high cementive value. With the preferred cements I have been able to acquire sufficient early strength for practical use in spite of the large volume of voids, and of the comparatively few bonds of cementation between the individual particles of the aggregate. The cements which I prefer to use for this purpose are any of the "early-hardening" cements now on the market, or a high alumina cement; one of these cements acquires more strength in two days after adding of water than ordinary Portland cement does in about a month, and all are permanently substantially stronger than Portland cement. Because of the rapidity with which such cement after setting acquires its final strength by practically complete petrification, it is peculiarly suitable for the formation of concrete according to this invention. The invention is also applicable with early-hardening cement consisting of ordinary hydraulic cement to which is added an "accelerator" not necessarily to hasten its setting, but to accelerate the final hardening of the petrifying mass; a well-known accelerator consists of calcium chloride to about 3% by weight of the cement, introduced either in the water or with the cement in powder form.

The aggregate may be of any hard, impervious, substantially incompressible material. While it is obvious that broken stone, rock, brick, slag, cinder, or the like may be used, I have found that trap rock is preferable for the aggregate because of its irregular fracture. It is important that the pieces or particles of aggregate shall be nearly all of approximately the same size, or a large proportion of which shall come within small limits of variation in size. For this purpose the best practice is to employ a somewhat coarse material and to screen out any materially smaller particles. Thus, for example, I may take a crushed stone which has passed through a three-fourths inch mesh, and pass it over a five-eighths inch mesh screen. The material rejected may be used separately by again screening out smaller particles. Generally speaking, it is desirable to take the material that passes through a given mesh and to pass it over a mesh the next size smaller, but rejecting anything that will pass through a quarter-inch-mesh screen.

The proportions of cement, aggregate and water which experience proves to be preferable are approximately (by weight) nine parts of aggregate to one part of cement, and only enough water to make a creamy semi-liquid mixture with the cement, or usually about 30 pounds of water to a bag (96 lbs.) of cement. The aggregate may be first wetted and dry cement be added, and the whole thoroughly mixed together; it being desirable in any case to start with dry aggregate in order to be able to control the quantity of water. It is good practice to mix the cement and water, stirring them thoroughly to make a smooth creamy mass which is added to the dry aggregate, and the whole is stirred or tumbled in order to distribute the cream-like cement thoroughly over the surface of the aggregate. It is important to avoid an excess of water which would not only weaken the cement, but would also tend to cause the cement cream to drain off from the particles of aggregate.

The concrete mass thus prepared may then be filled into molds and tamped down in the customary manner. This brings the particles of aggregate into close contact at their salient portions, while leaving large gaps or cavities between them. The cement in its semi-liquid form fills the minute capillary spaces at and closely surrounding the points of contact and, as the cement sets and hardens, form a strong bond at these points. With the correct proportions there will be little or no down-flow of semi-liquid cement from the surfaces of the aggregate or beyond the narrow spaces where it is held by capillarity. Ordinarily each piece of aggregate will be thinly coated with cement which ultimately hardens into a smooth coating like the surface of pottery or enamel. In the finished concrete this cement coating becomes the ultimate surface of each piece of the aggregate.

A wall constructed of applications of such concrete (or its equivalent) has a multiplicity of voids which are in most part intercommunicating, but which are of sufficient size to almost wholly avoid capillary action; any water which may enter the wall, therefore, will drain out readily, while at the same time moisture will not be drawn into the wall by capillarity.

Such a wall is illustrated in Figs. 1 and 2 of the drawing, wherein the lower part of the wall rests upon a suitable foundation such as A which preferably extends above the ground level, the wall B having an internal communicating cellular structure C, and a surface with an open cellular texture D.

To at least one side of the wall is applied a coating such as E which is preferably of some waterproof material, or semi-waterproof material such as plaster, mortar, or any other suitable coating which will substantially shed water and serve to make the cellular voids to a large extent dead air spaces. Thus the outer side may be covered with any usual stucco, which may be applied directly on the rough exterior surface of the wall, which is so pitted with cavities as to afford a perfect bond. On the inner side of the wall I also prefer to use a plaster F of some sort to constitute an inner facing, which also may be applied directly, no furring or lathing being needed. When the wall is substantially sealed on both sides, as is indicated in Fig. 2, the air spaces in the voids will be for all practical purposes dead. When so constructed with an inner and outer coating the invention reaches its maximum as a heat insulation. Preferably the outer coatings are not continued completely down to the support or base A, but only to the point H, so that if any water should enter the concrete through any defect in the upper part of the outer coating E, it may drain out through the opening H' thus left. Fig. 2 illustrates one form of the invention as applied to outer walls for houses or the like, and in this figure the outer coat E is of any desired stucco, being preferably a waterproof stucco which, as stated, is applied directly to the wall.

The preferred form of the invention, however, is illustrated in Fig. 3 (a partial section being shown in Fig. 5), which contains further features of improvement by which I am enabled to obtain unique effects which are very pleasing to the eye. In this figure I have shown one side of the coarse concrete having applied to it a sealing coat G which may be of neat cement or other suitable mortar, the material lying within or below the plane of the surface of the concrete. This may be done in any suitable manner, but it is most easily done by applying the sealing coat rather freely, as by a trowel; and after this coat has set, but before it is very hard, removing the excess on the exterior by scrubbing with burlap and water, for instance until the aggregate is exposed. The effect thus produced is that of a concrete structure with a great multiplicity of pieces of aggregate showing on the exterior, which pieces of aggregate may constitute a more or less connected exterior surface if sufficient of the sealing coat be removed, or if only a certain part of the coat is removed the surface will have the appearance of separated and discontinuous irregular particles of aggregate of a color preferably contrasting with the sealing coat. The exposed aggregate will have ordinarily the color of the bonding cement used in the concreting; although it is possible, but difficult and uneconomical, to remove this cement coating and thereby expose the natural color of the aggregate.

My invention also includes further improvements in such a structure which opens a wide range of decoration. In carrying my invention into effect in its preferred form I provide for coloring the aggregate, or such part thereof as will be exposed, with any color which may be desired. With such a construction, by selecting an appropriate color for the sealing coat a maximum range of color schemes may be adopted.

One way of producing a desired color effect is to apply a thin coating of a suitable coloring material of the desired color to the exterior surface of the aggregate (or of the cement coating on the aggregate), this being done before the sealing coat is applied. A suitable coating is of cement to which the desired coloring matter is added with sufficient water. It may be applied with a brush, or for large surfaces preferably by a pneumatic nozzle. It should not be applied in sufficient quantity to close or choke the cavities between the pieces of aggregate, as these are relied upon as the bond for the sealing coat next to be applied. Any coloring material more or less in the nature of cement paint, and preferably such a material as will set with a hard, weatherproof and enduring surface, may be used. When this coating of paint or the like has become sufficiently hard, the sealing coat is applied in the manner already described, and after it sets, but before it is very hard, the excess is removed on the exterior to expose the painted or colored surface of the aggregate. By a suitable choice of colors for the paint or other coating for the aggregate, and the neat cement or other mortar used for the sealing coat, any desired color effect on the outer surface of the wall may be attained.

An alternative method is to use for the cement which serves for bonding the aggregate in the first concreting operation, one having a suitable or desired color for the surface of the aggregate. Thus, for example, a white cement may be used, or a white cement to which any desired pigment is added. Then after removing the molds the mortar for the sealing coat may be applied as soon as the bonding cement has become hard enough to resist abrasion.

For either method, if the exposed outer surface of the aggregate is covered with cement or other superficial coating of similar properties, a wall is produced the surface of which is impervious, and the coating is extremely resistant to wear and the effect of weather, and when soiled may be repeatedly cleaned by scrubbing and thus restored to its original fresh condition. The method whereby a concrete having numerous voids is first produced and the outer surfaces of the aggregate are then coated with a suitable coloring medium such as cement paint, is preferable for economy because only as much of the coloring coating material is used as will suffice to cover the exterior surface of the aggregate.

Fig. 4 shows somewhat diagrammatically, and in a slightly exaggerated manner, a fragment of the wall in section, $a\ a$ being the pieces of aggregate, $b$ being the cement coating which completely surrounds each piece of aggregate, and $c\ c$ representing the voids left between the pieces. At $d$ the salient portions of the pieces of aggregate make contact and establish around the points of contact capillary spaces which are filled by the cement cream, whereby the areas of bearing faces are enlarged when the cement becomes hard; elsewhere the cement coating is much thinner. At $e\ e$ are shown the coating of colored cement or cement paint applied on the outer faces of the pieces of aggregate. At G is shown the sealing coat, which is crowded into the hollows between the pieces of aggregate, and the outer surface of which is applied substantially flat. The colored faces $e$ are exposed by cleaning off the coating material forming the sealing coat G, before the latter hardens.

Such surfacing of the concrete wall may, of course, be on the exterior or interior of the house or other structure. I have obtained numerous very decorative and pleasing effects which cannot, I believe, be duplicated by any other method. For external work it is preferable to use a coarse aggregate such, for example, as will not pass through a three-eighths inch screen or larger.

That portion of my invention which provides for imparting a multi-colored effect to the surface of a wall is not necessarily dependent upon the production of a concrete having a large proportion of voids; but is applicable to concreting performed in the ordinary manner, provided only that a considerable proportion of coarse aggregate is employed, so as to appear upon the exterior of the concrete wall; in such case it is necessary to partially scrub out the finer constituents from at and near the surface, preferably while the concrete is still green, both in order to expose the aggregate and to form hollows between the pieces of aggregate sufficient to form a bond for the sealing coat of neat cement or mortar which is then to be applied.

Wherein this specification I have described a wall it will be understood that this is used in a broad sense, and includes blocks or the like, or a complete wall constructed of such blocks.

While I have shown and described several forms of the invention it will be understood that I do not wish to be limited thereto, since various modifications may be made therein without departing from the spirit of the invention or the scope of the appended claims.

While my invention, so far as concerns the surface ornamentation of the concrete wall, finds its best embodiment in a wall having throughout its mass the hollows or voids described, obtained by the use of coarse aggregate without the addition of fine aggregate; yet the invention is not necessarily limited to that type of concrete wall structure.

What I claim is:

1. A wall comprising relatively large pieces of aggregate and a relatively small quantity of cement, and constructed so that the pieces of aggregate contact with each other at irregular points, and so that the spaces between the pieces of aggregate constitute at least 25% voids, and a coating for the wall on one side thereof, said coating confined within the plane of the exterior surface of the wall so as to expose the exterior part of said aggregate.

2. A wall according to claim 1, the aggregate being coated with cement and the exposed aggregate on the exterior having a colored coating over the cement.

3. A wall comprising a multiplicity of relatively large pieces of aggregate extending from within the body of the wall to the surface thereof, and a coating for such surface, such coating confined within the plane of the exterior surface of the wall so as to expose the exterior pieces of said aggregate, and the exterior part of said pieces being coated with coloring material.

4. A wall according to claim 3, the coloring material on the exposed exterior part of said aggregate being of a different color from the exterior coating between such exterior pieces of aggregate.

5. A wall comprising a concrete having voids and having a sealing coat at the exterior of said concrete but excluded from a portion of the lower part of the exterior face of said concrete, and thus permitting drainage of any water which might enter through any defect in the upper part of said sealing coat.

6. A wall comprising a multiplicity of relatively large pieces of aggregate extending from within the body of the wall to the surface thereof, the pieces of aggregate being coated with bonding cement, and the wall having a sealing coat confined within the plane of the exterior surface of the wall so as to expose the cement coating on the exterior of the outermost pieces of aggregate.

7. A wall according to claim 6, wherein such sealing coat has a color different from the color of the bonding cement exposed on said outermost pieces of aggregate.

8. A wall according to claim 6, wherein the cement coating on the aggregate extending outwardly of the plane of the sealing coat has a coating of coloring material exposed to view.

9. A wall according to claim 6, wherein the cement coating on the aggregate extending outwardly of the plane of the sealing coat has a coating of coloring material exposed to view, which is of a different color from the sealing coat.

In witness whereof, I have hereunto signed my name.

ROWLAND T. WALES.